US012577907B2

(12) United States Patent
Staubach et al.

(10) Patent No.: US 12,577,907 B2
(45) Date of Patent: Mar. 17, 2026

(54) INTER-TURBINE BURNER IN RECUPERATION CYCLE ENGINE

(71) Applicant: RTX CORPORATION, Farmington, CT (US)

(72) Inventors: Joseph B. Staubach, Colchester, CT (US); Joseph E. Turney, Amston, CT (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/905,701

(22) Filed: Oct. 3, 2024

(65) Prior Publication Data

US 2025/0027443 A1 Jan. 23, 2025

Related U.S. Application Data

(62) Division of application No. 18/102,356, filed on Jan. 27, 2023, now Pat. No. 12,129,787.

(51) Int. Cl.
F02C 3/30 (2006.01)
(52) U.S. Cl.
CPC .......... F02C 3/30 (2013.01); F05D 2220/323 (2013.01); F05D 2240/35 (2013.01)
(58) Field of Classification Search
CPC ........................................................ F02C 3/30
See application file for complete search history.

(56) References Cited

U.S. PATENT DOCUMENTS

| | | | |
|---|---|---|---|
| 4,272,953 A | 6/1981 | Rice | |
| 5,761,896 A * | 6/1998 | Dowdy | F01K 25/005 |
| | | | 60/39.55 |
| 5,906,095 A * | 5/1999 | Frutschi | F02C 6/003 |
| | | | 60/39.182 |
| 7,254,951 B2 | 8/2007 | Lockwood, Jr. | |
| 2020/0332681 A1* | 10/2020 | Uechi | F01K 7/32 |
| 2021/0207500 A1 | 7/2021 | Klingels et al. | |
| 2022/0243667 A1 | 8/2022 | Rambo | |

FOREIGN PATENT DOCUMENTS

EP          4343130 A1          3/2024

OTHER PUBLICATIONS

Extended European Search Report for European Application No. 24154539.1 mailed Jun. 7, 2024.

* cited by examiner

*Primary Examiner* — Katheryn A Malatek
(74) *Attorney, Agent, or Firm* — Carlson, Gaskey & Olds, P.C.

(57) ABSTRACT

A turbine engine assembly an inter-turbine burner that is disposed between at least two of a plurality of turbine stages where an additional amount of fuel is mixed with an exhaust gas flow to generate a reheated gas flow. A condenser extracts water from the reheated gas flow and an evaporator system generates a steam flow from at least a portion of water that is extracted by the condenser for injection into the core airflow.

19 Claims, 3 Drawing Sheets

INTER-TURBINE BURNER IN RECUPERATION CYCLE ENGINE

CROSS-REFERENCE TO RELATED APPLICATION

This application is a Divisional of U.S. application Ser. No. 18/102,356 filed on Jan. 27, 2023.

TECHNICAL FIELD

The present disclosure relates generally to an aircraft propulsion system that includes a steam generation system transforming recovered water into a steam flow injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Steam injection can provide improved propulsive efficiencies. Water recovered from the high energy exhaust may be transformed into steam using the remaining thermal energy from the exhaust gas flow. Steam injection improves mass flow through the turbine section and thereby improves engine efficiency. However, engine operation may not support the amount of steam generation needed to realize the beneficial efficiencies.

Turbine engine manufacturers continue to seek further improvements to engine performance including improvements to reduce environmental impact while improving thermal and propulsive efficiencies.

SUMMARY

A turbine engine assembly according to an exemplary embodiment of this disclosure, among other possible things includes a compressor section where a core airflow is compressed, a combustor section where the compressed core airflow from the compressor section is mixed with fuel and ignited to generate an exhaust gas flow, a turbine section that includes at least two turbine stages through which the exhaust gas flow expands to generate a mechanical power output, an inter-turbine burner that is disposed between the at least two turbine stages. Wherein the in the inter-turbine burner an additional amount of fuel is mixed with the exhaust gas flow to generate a reheated gas flow, a condenser where water is extracted from the reheated gas flow that is exhausted from the turbine section, and an evaporator system that is disposed between the at least tow turbine stages and the condenser. The evaporator system is configured for generating a steam flow from at least a portion of water that is extracted by the condenser for injection into the core airflow.

In a further embodiment of the foregoing, wherein the turbine section includes a first turbine section and at least one other turbine section and the inter-turbine burner is disposed between the first turbine section and the at least one other turbine section.

In a further embodiment of any of the foregoing, wherein a portion of the evaporator system is disposed between a first stage and a second turbine stage of the at least two turbine stages.

In a further embodiment of any of the foregoing, a portion of the steam flow is communicated to the combustor section and added to the gas flow that is generated in the combustor section.

In a further embodiment of any of the foregoing, the evaporator system includes a first evaporator disposed between a first turbine stage and a second turbine stage of the at least two turbine stages and a second evaporator that is disposed between the turbine section and the condenser.

In a further embodiment of any of the foregoing, the first evaporator generates a first steam flow and the second evaporator generates a second steam flow. Both the first steam flow and the second steam flow are communicated to at least one of the combustor and the inter-turbine burner.

In a further embodiment of any of the foregoing, the first evaporator receives a flow of steam or hot water from the second evaporator.

In a further embodiment of any of the foregoing, a bypass flow through a bypass flow path is communicated to the condenser for cooling the exhaust gas flow.

In a further embodiment of any of the foregoing, the inter-turbine burner includes a different power output capacity than the combustor section.

An aircraft propulsion system according to another exemplary embodiment of this disclosure, among other possible things includes a compressor section where a core airflow is compressed, a combustor section where a compressed core airflow is mixed with fuel and ignited to generate an exhaust gas flow, a first turbine section through which the exhaust gas flow expands to generate power, an inter-turbine burner where the exhaust gas flow from the first turbine section is mixed with fuel and ignited to generate a reheated gas flow, a second turbine section through which the reheated gas flow expands to generate power, a condenser where water is extracted from the gas flow that is exhausted from the turbine section, and an evaporator system that is disposed between the inter-turbine burner and the condenser. The evaporator system generates a steam flow by heating extracted water with heat from the reheated exhaust gas flow. A portion of the steam flow is communicated to the combustor section and added to the gas flow that is generated in the combustor section.

In a further embodiment of the foregoing, the evaporator system includes a first evaporator that is separated from a second evaporator. Each of the first evaporator and the second evaporator transfer heat from the reheated gas flow into the extracted water.

In a further embodiment of any of the foregoing, the evaporator system communicates a steam flow to each of the combustor section and the inter-turbine burner.

In a further embodiment of any of the foregoing, a mass flow rate of the core flow into the condenser is more than 10% higher than the core airflow within the compressor section.

In a further embodiment of any of the foregoing, the molecular oxygen content of the core flow that exits through a core nozzle is less than 10% oxygen by mass at high engine power.

A method of operating a turbine engine according to another exemplary embodiment of this disclosure, among other possible things includes compressing a core airflow in a compressor section, generating a gas flow by igniting a mixture of the compressed core airflow and fuel within a combustor section, generating a power output by expanding the gas flow through a first turbine section, generating a reheated gas flow by igniting a mixture of exhaust gases from the first turbine section and fuel within an inter-turbine burner, generating an additional power output by expanding the reheated gas flow through a second turbine section, extracting water from the reheated exhaust gas flow in a condenser, generating a steam flow by heating the extracted water in an evaporator that is disposed between at least one of a plurality of turbine stages and the condenser, and injecting the steam flow into the core flow.

In a further embodiment of the foregoing, a portion of the steam flow is communicated to at least one of the combustor section and the inter-turbine burner.

In a further embodiment of any of the foregoing, the evaporator includes a first evaporator that is separated from a second evaporator with both the first evaporator and the second evaporator generating a steam flow.

In a further embodiment of any of the foregoing, the condenser is cooled with a portion of a bypass airflow within the condenser.

In a further embodiment of any of the foregoing, a mass flow rate of the core flow into the condenser is more than 10% higher than the core flow in the compressor.

In a further embodiment of any of the foregoing, a molecular oxygen content of the core flow exiting a core nozzle is less than 10% oxygen by mass at high engine power.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
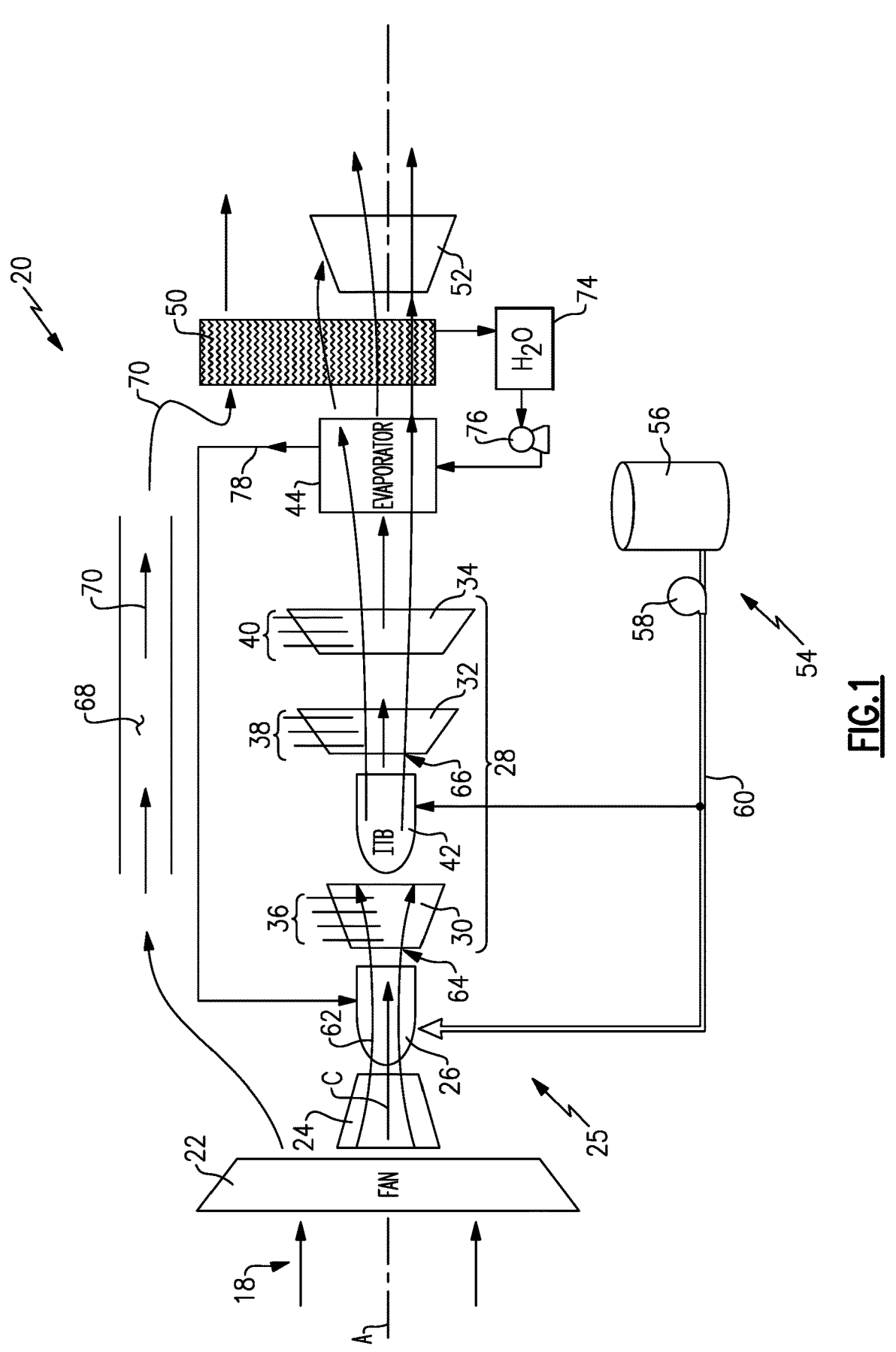
FIG. 1 is a schematic view of an example aircraft propulsion system embodiment.

FIG. 1 schematically illustrates an example propulsion system 20 including a core engine 25 with an inter-turbine burner 42 and an evaporator system 44. The inter-turbine burner 42 reheats an exhaust gas flow to increase the amount of thermal energy available in the evaporator system 44 for transforming water into a steam flow. The steam flow is combined with a core airflow to increase power output from the turbine section.

The engine 20 includes a fan section 22, a compressor section 24, a combustor section 26 and the turbine section 28. The fan section 22 drives inlet airflow 18 along a bypass flow path 68, while the compressor section 24 draws air in along a core flow path C where a core airflow 62 is compressed and communicated to a combustor section 26. In the combustor section 26, compressed core airflow 62 is mixed with a fuel flow 60 and ignited to generate the high energy combusted exhaust gas flow 64 that expands through the turbine section 28 where energy is extracted and utilized to drive the fan section 22 and the compressor section 24.

The engine 20 includes a fuel system 54 that includes a fuel tank 56 and a pump 58 for generating the fuel flow 60. The example fuel system 54 is configured to provide a hydrogen based fuel such as a liquid hydrogen ($LH_2$) and may include heat exchangers for boiling the fuel flow. Although hydrogen is disclosed by way of example, other non-carbon based fuels could be utilized and are within the contemplation of this disclosure. Moreover, the disclosed features may also be beneficial in an engine configured to operate with traditional carbon based fuels.

The disclosed turbine section 28 includes a first turbine section 30, a second turbine section 32 and a third turbine section 34. The first turbine section 30 includes a first plurality of turbine stages 36. The second turbine section 32 includes a second plurality of turbine stages 38 and the third turbine section 34 includes a third plurality of turbine stages 40. In one disclosed example, the first turbine section 30 is a high pressure turbine section, the second turbine section 32 is an intermediate pressure turbine section and the third turbine section 34 is a low pressure turbine section. Although not shown, each of the turbine sections 30, 32 and 34 may be coupled to drive portions of the compressor section 24 and the fan 22. It should be appreciated, that other turbine section configurations could be utilized and remain within the scope and contemplation of this disclosure.

The example turbine section 28 includes an inter-turbine burner 42 that is disposed between the first turbine section 30 and the second turbine section 32. The inter-turbine burner 42 receives a fuel flow 60 that is mixed with the exhaust gas flow 64 from the first turbine section 30 and ignited to generate a reheated gas flow 66. While the example inter-turbine burner 42 is shown at a specific location in the turbine section 28, the inter-turbine burner 42 may be located between at least two of any of the plurality of turbine stages 36, 38 and 40 within the scope and contemplation of this disclosure.

The inter-turbine burner 42 provides for burning of a higher percentage of oxygen ingested into the core engine 25. Some of the increased use of oxygen is from the recovery of some turbine cooling air that was bypassed around the combustor section 26 for burning in the inter-turbine burner 42. Additionally, increased use of otherwise exhausted oxygen provides for more fuel to be burned for a given maximum temperature limit. The use of additional oxygen remaining in the core flow after the combustor section provides for a lower amount of oxygen to be exhausted to the ambient environment through the nozzle 52. In one example embodiment, the molecular content of the core flow 62 exiting through the core nozzle 52 is less than 10% oxygen by mass at high engine power. High engine power are conditions such as during operation to generate thrust required for takeoff and for climbing to altitude. Other high engine power conditions as understood by those skilled in the art would also benefit from the increased burning of oxygenated fuel and are within the contemplation and scope of this disclosure.

The reheated gas flow 66 is expanded through the second and third turbines 32, 34 to generate shaft power. The inter-turbine burner 42 further increases the thermal energy available in the reheated exhaust gas flow 66 for use in generating steam in the evaporator system 44. The reheated gas flow 66 is of an increased temperature to provide an increase in power as compared to the gas flow exhausted from the first turbine 30 and first group of turbines stages 36.

The example disclosed evaporator system 44 is disposed between the turbine section 28 and the condenser 50 such that the reheated gas flow 66 provides heat energy to transform extracted water into steam. Water flow 72 is provided by a pump 76 that pressurizes water from a storage tank 74. The water in the storage tank 74 is at least partially from water recovered by the condenser 50. The condenser 50 receives a portion of the bypass airflow 70 to provide the cooling flow needed to recover liquid from the reheated exhaust gas flow 66. The reheated exhaust as flow 66 flows through the condenser 50 and is exhausted through an exhaust nozzle 52 to the ambient environment.

The evaporator system 44 generates a steam flow 78 communicated into the core flow 62 to increase mass flow through the turbine section 28 and thereby increases engine power and efficiency. The engine 20 has an increased power output from the injected steam 66 due to an increasing mass flow through the turbine section 28 without a corresponding increase in work from the compressor section 24. The increased mass flow provided by the steam results in an increased mass flow at the condenser 50 and core nozzle 52 as compared to the mass flow through the compressor section 24. In one disclosed example embodiment, a mass flow rate of the reheated gas flow 66 that is communicated to the condenser 50 is more than 8% higher than the core airflow 62 within the compressor section 24 and communicated to the combustor 26. In another example embodiment, the mass flow rate of the reheated gas flow 66 is more than 10% higher than the core airflow 62 within the compressor section 24 and communicated to the combustor section 26.

The increased use of oxygen supplements the injection of steam flow that further increases mass flow. An example engine operation cycle may include up to (or more than) 35% steam-air-ratios (SAR) and may be assisted by a multiple fold (e.g., 2×, 3×, etc.) increase in moisture from burning $H_2$ as the fuel.

Figure 2:
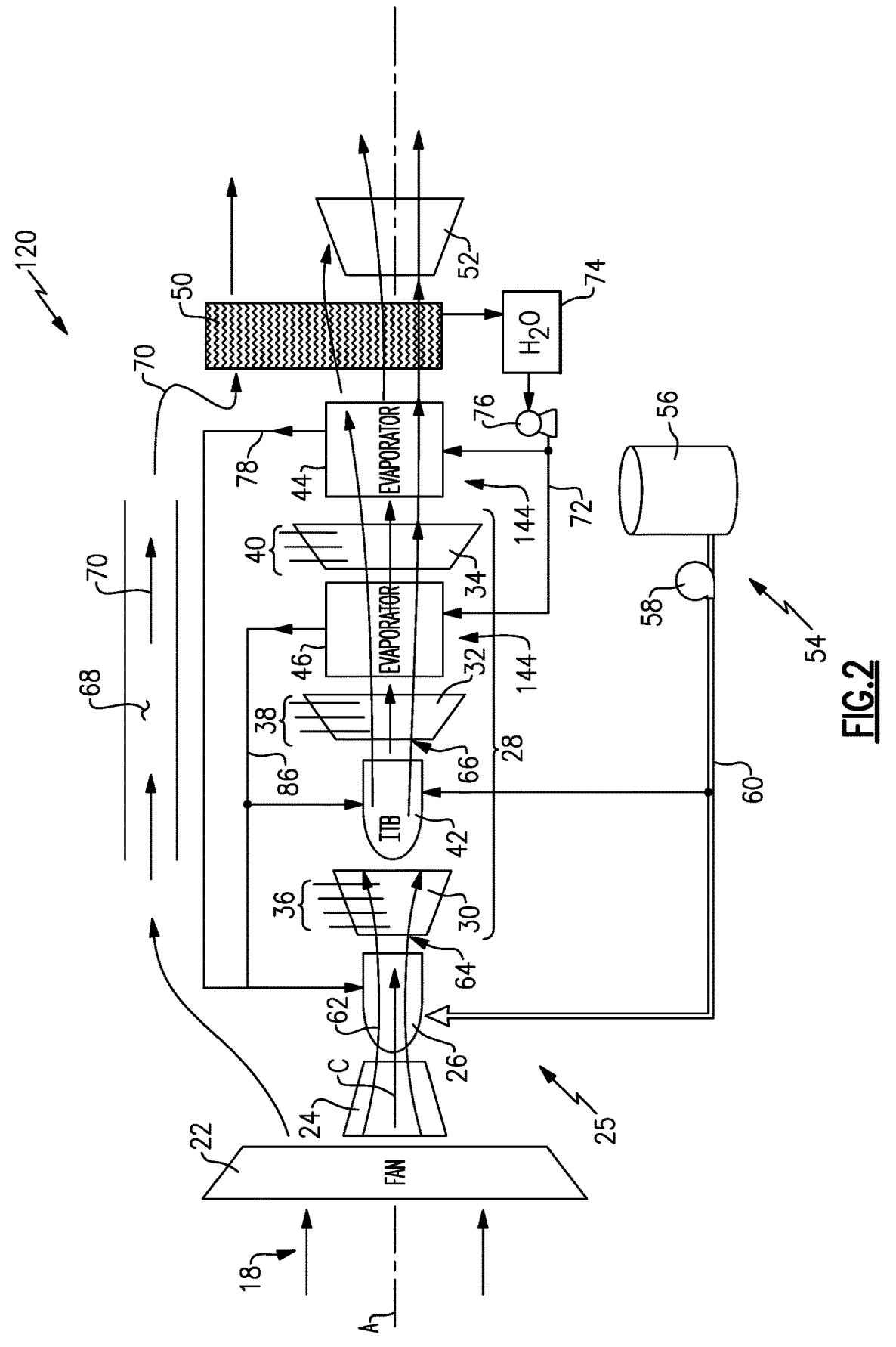
FIG. 2 is a schematic view of another example aircraft propulsion system embodiment.

Referring to FIG. 2, another example aircraft propulsion system embodiment is schematically shown and indicated at 120. The engine 120 includes an evaporator system 144. The evaporator system 144 includes a first evaporator 46 that is disposed between at least two of the plurality of turbine stages 38, 40 downstream from the inter-turbine burner 42.

In one example embodiment, the first evaporator 46 is disposed between the second turbine 32 and the third turbine 34. A second evaporator 48 is positioned to receive the reheated exhaust gas flow 66 that exits a last stage of the third turbine section 34. In one example embodiment, the last turbine stage is part of the third plurality of turbine stages 40 that are part of the third turbine section 34. It should be appreciated that, although the example turbine section 28 is shown and described with first, second and third turbines 36, 38 and 40, other turbine configurations could be utilized and are within the contemplation and scope of this disclosure.

The first evaporator 46 generates the steam flow 78 and the second evaporator 48 generates a second steam flow 80. The steam flow 78, 80 may be combined or individually communicated to the combustor 26 and core flow 62. The steam flows 78, 80 communicated into the core flow 62 increase mass flow through the turbine section 28 and thereby increase engine power and efficiency.

Figure 3:
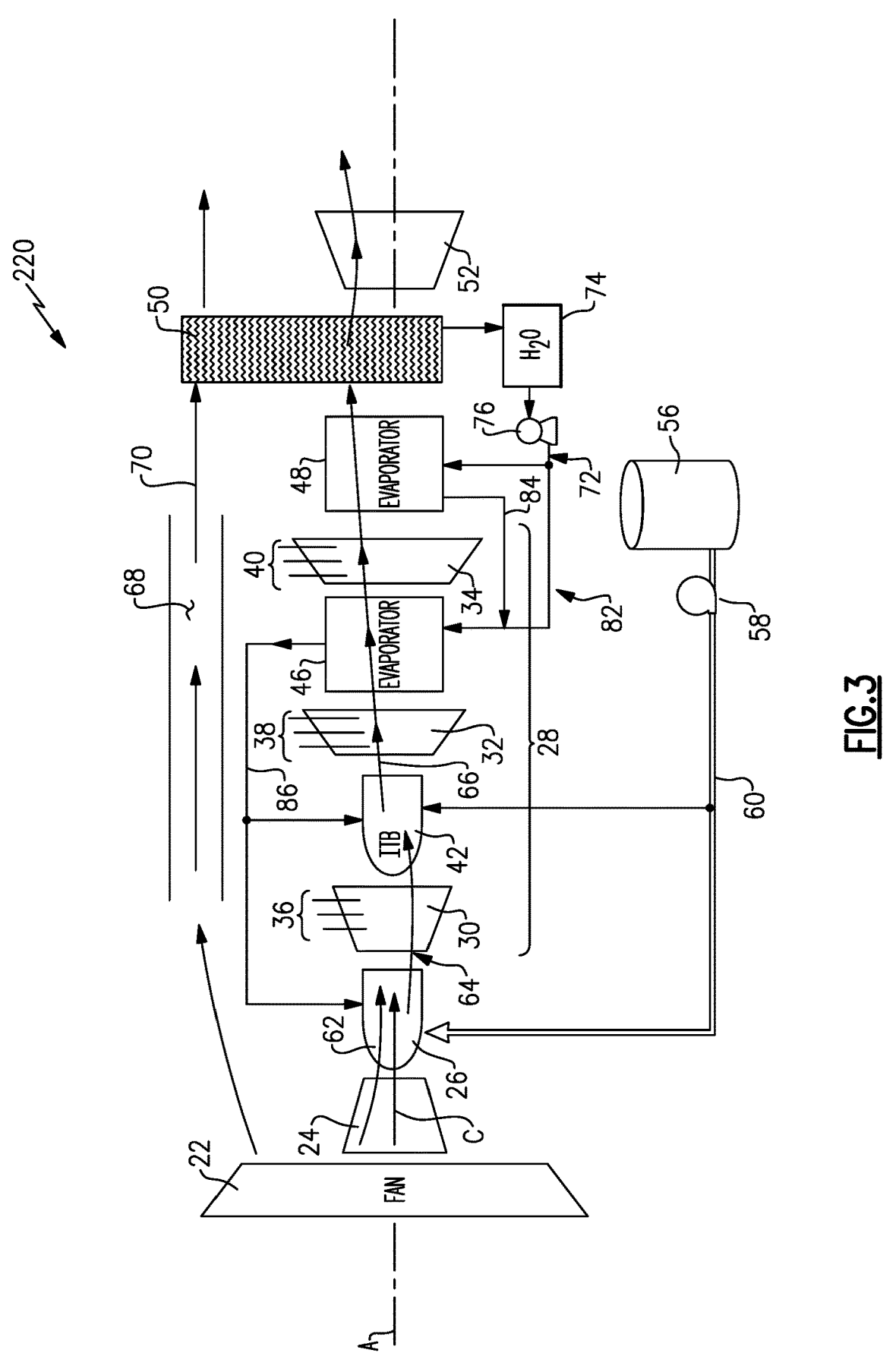
FIG. 3 is a schematic view of yet another example aircraft propulsion system embodiment.

Referring to FIG. 3, another example engine embodiment is schematically shown an indicated at 220 and includes another example evaporator system 82. The example evaporator system 82 includes a first evaporator 46 that is disposed between the second turbine section 32 and the third turbine section 48.

A flow of steam or hot water 84 from the second evaporator 48 is communicated to the first evaporator 46. The first evaporator 46 is exposed to a much hotter reheated exhaust gas flow 66 due to the closer axial proximity to the inter-turbine burner 42. The second evaporator 48 is spaced axially further from the inter-turbine burner 42 and receives the reheated exhaust gas flow 66 after it has expanded through the second turbine section 32 and imparted thermal energy into the water flow within the first evaporator 46.

Accordingly, the flow 84 from the second evaporator 48 may not have a desired amount of thermal energy. The flow 84 may then be communicated to the first evaporator 46 for additional heating and generation of the steam flow 86. The thermal energy input into the flow 84 is therefore combined with additional thermal energy in the first evaporator 46 where the steam flow is generated and communicated to at least the combustor 62.

In one example embodiment, the steam flow 86 is also communicated to the inter-turbine burner 42 to further impart additional energy and increase mass flow through the second turbine 32 and the third turbine 34.

Although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The example engine embodiments recover energy otherwise lost as waste heat in the form of an injected steam flow and reheating of exhaust gas flow to increase power output of the turbine section and assure sufficient available thermal energy for generation of steam in the evaporator system 44.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section where a core airflow is compressed;
a combustor section where the compressed core airflow from the compressor section is mixed with fuel and ignited to generate an exhaust gas flow;
a turbine section including at least two turbine stages through which the exhaust gas flow expands to generate a mechanical power output;
an inter-turbine burner disposed between the at least two turbine stages, wherein in the inter-turbine burner an additional amount of fuel is mixed with the exhaust gas flow to generate a reheated gas flow;
a condenser where water is extracted from the reheated gas flow exhausted from the turbine section; and
an evaporator system disposed between a first turbine stage of the at least two turbine stages and the condenser, the evaporator system configured for generating a steam flow from at least a portion of water extracted by the condenser for injection into the core airflow, wherein the evaporator system includes a first evaporator separated from a second evaporator, wherein each of the first evaporator and the second evaporator transfer heat from the reheated gas flow into the extracted water.

2. The turbine engine assembly as recited in claim 1, wherein the turbine section includes a first turbine section and at least one other turbine section and the inter-turbine burner is disposed between the first turbine section and the at least one other turbine section.

3. The turbine engine assembly as recited in claim 1, wherein the at least two turbine stages comprise the first turbine stage and a second turbine stage and one of the first evaporator and the second evaporator is disposed between the first turbine stage and the second turbine stage.

4. The turbine engine assembly as recited in claim 1, wherein a portion of the steam flow is communicated to the combustor section and added to the gas flow generated in the combustor section.

5. The turbine engine as recited in claim 1, wherein the at least two turbine stages comprise the first turbine stage and a second turbine stage and the first evaporator is disposed between the first turbine stage and the second turbine stage; and the second evaporator is disposed between the turbine section and the condenser.

6. The turbine section as recited in claim 5, wherein the steam flow comprises a first steam flow generated by the first evaporator and a second steam flow generated by the second evaporator, where both the first steam flow and the second steam flow are communicated to at least one of the combustor and the inter-turbine burner.

7. The turbine engine as recited in claim 5, wherein the first evaporator receives the steam flow or hot water from the second evaporator.

8. The turbine engine assembly as recited in claim 1, wherein a bypass flow through a bypass flow path is communicated to the condenser for cooling the exhaust gas flow.

9. The turbine engine assembly as recited in claim 1, wherein the inter-turbine burner comprises a different power output capacity than the combustor section.

10. The turbine engine assembly as recited in claim 1, wherein the evaporator system communicates the steam flow to each of the combustor section and the inter-turbine burner.

11. The turbine engine assembly as recited in claim 1, wherein a mass flow rate of the core flow into the condenser is more than 10% higher than the core airflow within the compressor section.

12. The turbine engine assembly as recited in claim 1, wherein the molecular oxygen content of the core flow exiting through a core nozzle is less than 10% oxygen by mass at high engine power.

13. A method of operating a turbine engine comprising:
  compressing a core airflow in a compressor section to generate a compressed core airflow;
  generating an exhaust gas flow by igniting a mixture of the compressed core airflow and fuel within a combustor section;

generating a power output by expanding the exhaust gas flow through at least one of a plurality of turbine stages;
  generating a reheated exhaust gas flow by igniting a mixture of exhaust gases from a first turbine stage of the plurality of turbine stages and fuel within an inter-turbine burner;
  generating an additional power output by expanding the reheated gas flow through another a second turbine stage of the plurality of turbine stages;
  extracting water from the reheated exhaust gas flow in a condenser;
  generating a first steam flow by heating a first portion of the extracted water in a first evaporator that is disposed between the first turbine stage and the condenser;
  generating a second steam flow by heating a second portion of the extracted water in a second evaporator disposed between at least two of the plurality of turbine stages and separated from the first evaporator; and
  injecting at least one of the first steam flow and the second steam flow into the core flow.

14. The method as recited in claim 13, wherein a portion of the at least one of the first steam flow and the second steam flow is communicated to at least one of the combustor section and the inter-turbine burner.

15. The method as recited in claim 13, wherein a portion of the at least one of the first steam flow and the second steam flow is communicated into both of the combustor section and the inter-turbine burner.

16. The method as recited in claim 13, wherein the condenser is cooled with a portion of a bypass airflow within the condenser.

17. The method as recited in claim 13, wherein the first evaporator is disposed between an aft most stage of the plurality of turbine stages and the condenser.

18. The method as recited in claim 13, further comprising generating a mass flow rate of the core flow into the condenser is more than 10% higher than the core flow in the compressor.

19. The method as recited in claim 13, further comprising generating a molecular oxygen content of the core flow exiting a core nozzle is less than 10% oxygen by mass at high engine power.

*   *   *   *   *